Patented Feb. 21, 1939

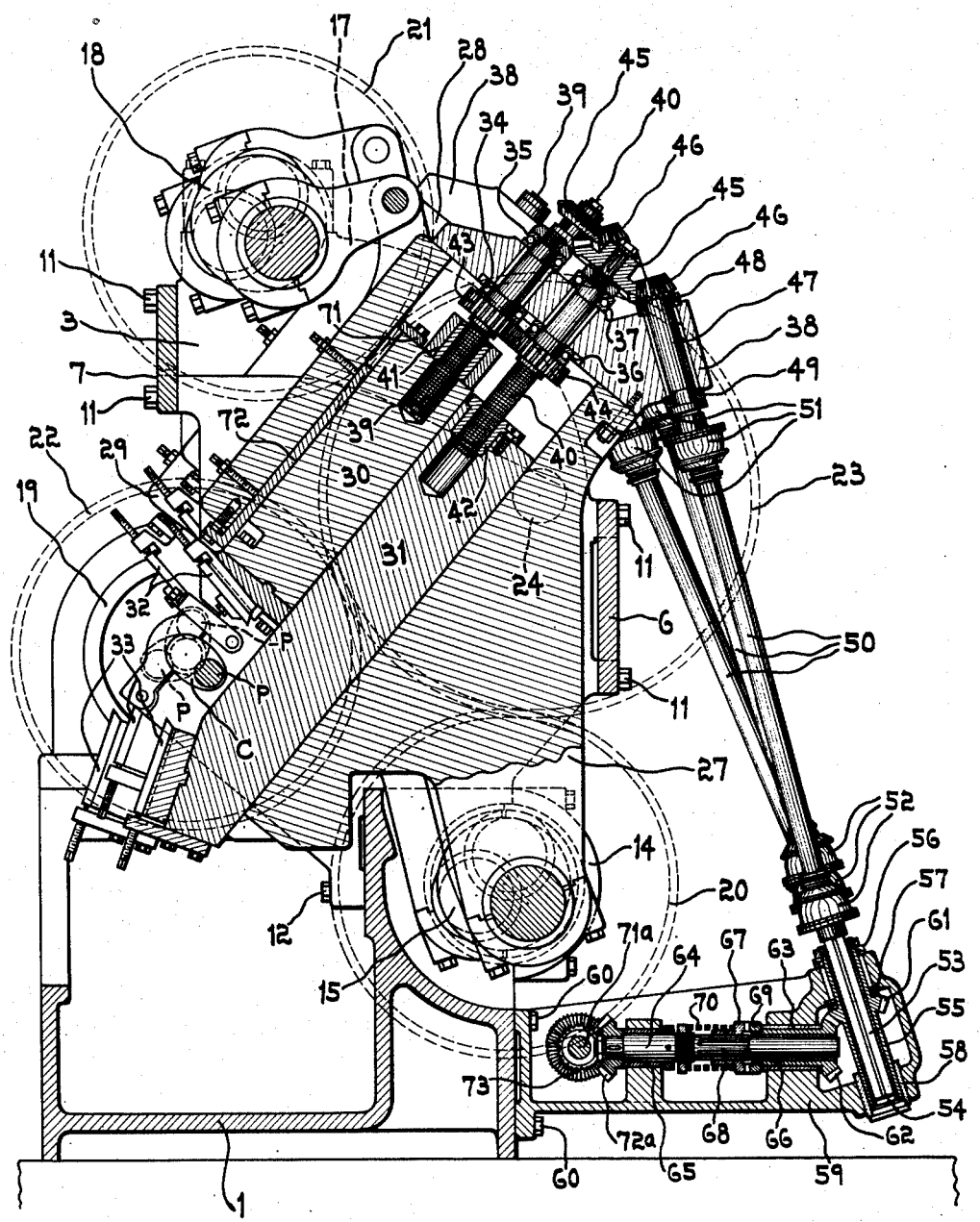
FIG. I

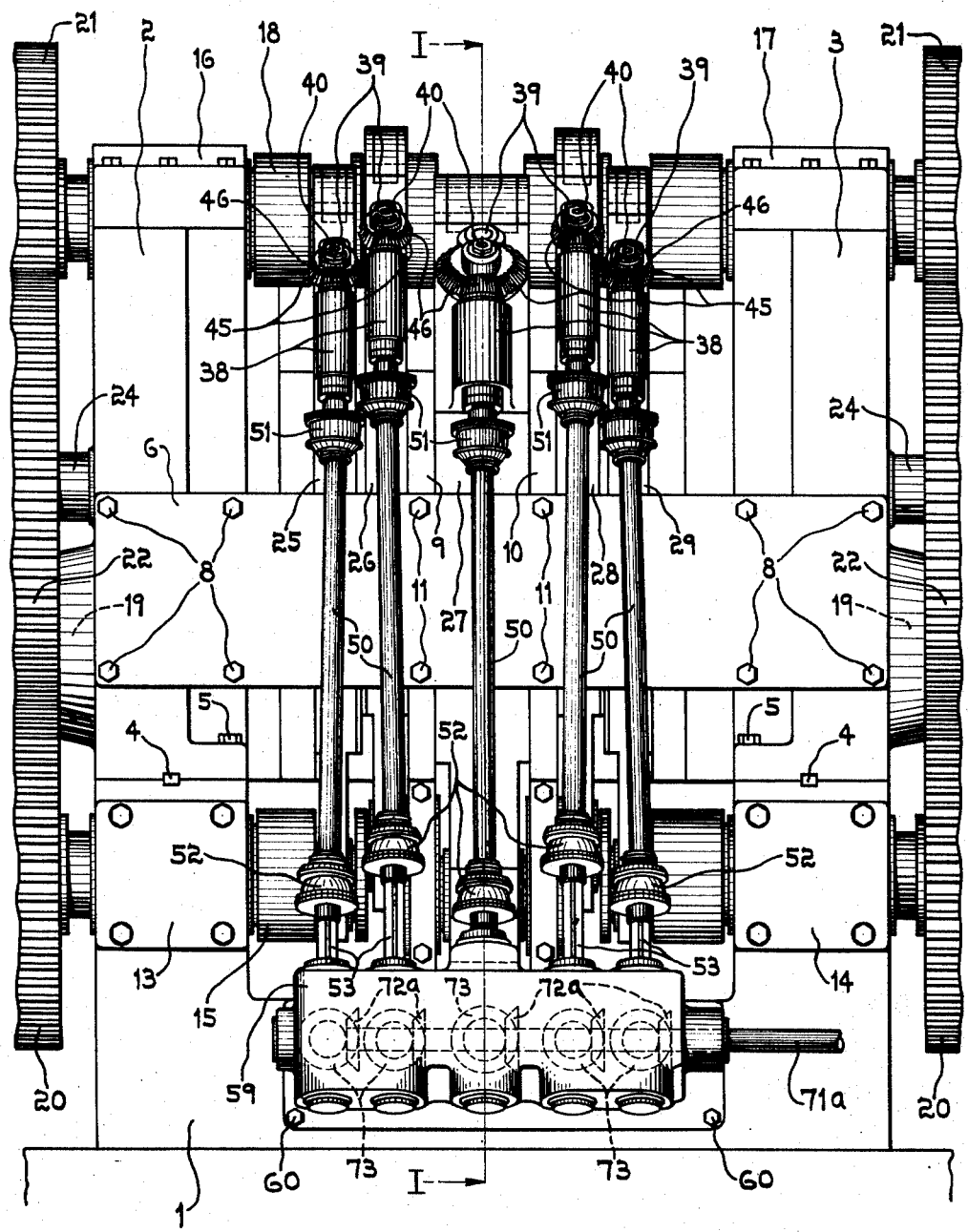
Fig. II

2,148,349

UNITED STATES PATENT OFFICE 2,148,349

ORBITAL LATHE FEED MECHANISM

William F. Groene and Harold J. Siekmann, Cincinnati, Ohio, assignors to The R. K. Le Blond Machine Tool Company, Cincinnati, Ohio, a corporation of Delaware Application October 18, 1937, Serial No. 169,550

8 Claims. (Cl. 82—9)

This invention pertains to tool feeding mechanism for orbital or crankpin turning lathes in which the tool carriers and tools are actuated in orbital movement to follow the crank pins of a crankshaft to be machined. More specifically, this invention pertains to improvements in mechanical feeding arrangements for lathes of a character set forth in Patents 1,744,885 issued January 28, 1930; Re. 18,662 reissued November 22, 1932; 1,921,919 issued August 8, 1933; and 1,938,696 issued December 12, 1933.

An object of our invention is to provide an improved mechanical feed for the tool bars on each of the tool carriers of an orbital lathe adapted to turn simultaneously a plurality of crank pins on a crankshaft.

Another object is to provide in a mechanical feed mechanism for such an orbital lathe means whereby the tool bars in each of the tool carriers may be constantly fed to or from the work during the orbital movement of the tool carriers and independently of said orbital movement.

Still another object is to provide in such an arrangement means whereby one or more of the tool bars of each tool carrier may be arrested in movement while the remaining tool bars of other units continue their feeding movements relative to the work piece without in any way damaging the feed mechanism.

And still another object is to provide an arrangement of this character means whereby the tool bars in each of the tool carriers are brought against positive stops at the completion of the cutting cycle.

Further features of this invention will be pointed out in the following description of the drawings in which:

Figure I is a vertical transverse section through an orbital lathe on the line I—I of Figure II, particularly showing a tool carrier with reciprocatable tool bars and the mechanical driving mechanism for actuating the bars.

Figure II is a rear elevation of the orbital lathe shown in Figure I showing the general arrangement of the feeding mechanism for each tool carrier.

The lathe has a base 1 with upright housings 2 and 3 mounted on each end of the base and secured in place by keys 4 and bolts 5. A rear tie bar 6 and a front tie bar 7 are bolted to the housings 2 and 3 by bolts 8 to further stiffen these supports and to provide supporting means for the steady rest units which are bolted to these tie bars by bolts 11 and also to the base 1 by bolts 12. On the base 1 in bearing boxes 13 and 14 is journaled a lower master crankshaft 15 and on the tops of the housings 2 and 3 in the respective bearing boxes 16 and 17 is journaled the upper master crankshaft 18. In the lower front portions of each of the housings 2 and 3 is mounted the work spindles 19 which carry suitable chucks of a character for example, as set forth in Patent 1,878,130 issued September 20, 1932, for supporting and rotating a crankshaft C on its main axis of rotation. Identical gears 20 fixed on the ends of master crankshaft 15, gears 21 fixed on the ends of master crankshaft 18, and gears 22 fixed on the work spindles 19 are all interconnected with the common idler gears 23 rotatably mounted on studs 24 fixed in the housings 2 and 3 whereby the master crankshafts 15 and 18 and the work spindles 19 are rotated in synchronism when driven by a suitable source of power.

On the crank pins of the master crankshafts are mounted the tool carrier units 25, 26, 27, 28, and 29 in a manner fully disclosed in the above mentioned Patents 1,744,885; Re. 18,662; 1,921,919; and 1,938,696. In each of the tool carriers are movably mounted tool bars 30 and 31 which carry tools 32 and 33 for feeding to and from a crankpin P of the crankshaft C from opposite sides. Journaled in suitable bearings 34, 35, 36 and 37 in a bracket 38 fixed to the tool carriers are screws 39 and 40, each having the same hand threads operating in nuts 41 and 42 respectively fixed to the tool bars 30 and 31. Gears 43 and 44 are respectively fixed on the screws and are in mesh so that rotation of one of the screws, for example screw 40, causes the other screw to rotate in the other direction whereby the tool bars 30 and 31 may be moved simultaneously in opposite directions. On the screw 40 is fixed a bevel gear 45 which is driven by the bevel pinion 46 of the bevel pinion shaft 47 journaled in suitable bearings 48 and 49 in the bracket 38. The bevel pinion shaft 47 is connected to a propeller shaft 50 through an upper universal joint 51. The lower end of the propeller shaft is connected through an universal joint 52 to a splined shaft 53 which slides in a splined bore 54 in the bevel gear sleeve 55 rotatably mounted in the bearings 56, 57, and 58 carried in a frame 59 secured to the rear portion of base 1 by bolts 60.

On the sleeve 55 is formed a bevel gear 61 which in turn is driven by a bevel pinion 62 journaled in a bearing 63 in the frame 59, the bevel pinion 62 being driven by a drive shaft 64 journaled in a bearing 65 in the frame 59 and in the bore 66 of pinion 62 which has a clutch 67 slidably mounted on the splined portion 68 of shaft 64 which is normally urged into engagement with the clutch 69 formed on pinion 62 by the compression coil spring 70. This clutching arrangement is so constructed that the clutches 67 and 69 will slip upon one another when the tool bars engage a positive abutment, as when the stop block 71 on bar 30 engages the end of the gib 72 when sizing the work, or when the cutting pressure on the tools becomes too great. This actuating mechanism just described is provided for the tool bars in each of the tool carriers 25, 26, 27, 28 and 29. It will be noted that the mechanism for the center tool carrier 27, which is wider than the other four carriers is made heavier than for the other four. The reason for this is that in simultaneously turning all of the crank pins of a four-line-bearing six-throw-crankshaft the number three and four pins are co-axial and adjacent one another so that a single wide tool carrier for both of said pins can best be employed. Thus a heavier feed drive is required since two pins are to be turned by the unit 27 whereas one pin is turned by each of the four units.

By means of the arrangement just described an independent mechanical feed drive is provided for each of the tool carriers. The shaft 53 is free to slide in the sleeve 55 to take care of orbital movement of the tool carriers as feeding motion is applied by rotating the sleeve 55 by the drive shaft 54 as described.

All of the drive shafts 64 are connected to a common feed drive shaft 71a through bevel gears 72a on the shafts 64 and bevel pinions 73 fixed on the shaft 71a so that by rotating shaft 71a one way or the other the tool bars 30 and 31 may be simultaneously operated in all of the tool carriers during their orbital movement. By use of the clutching arrangement described on each of the shafts 64, the bringing of all of the tool bars 30 and 31, in each of the tool carriers down to their respective stops 71 when driven from a single shaft 71a is assured. The shaft 71a may be driven from a separate source of power or may be connected to the gearing for the master crank-shafts 15 and 18 and the work spindles 19 as desired.

Having fully set forth and described our invention what we claim is:

1. In an orbital lathe, an orbitally moving tool carrier, tool holding means movable in said carrier, mechanical driving means for actuating said tool holding means, means inter-connecting said last mentioned means to said tool holding means whereby the movement of said tool holding means may be arrested without stopping said driving means, and means for operating said tool carrier in orbital movement.

2. In an orbital lathe, orbitally moving tool carriers, tool holding means movable in each of said carriers, mechanical driving means for actuating said tool holding means, means inter-connecting said last mentioned means to said tool holding means whereby the movement of said tool holding means in at least one of said carriers may be arrested without stopping said driving means, and means for operating said tool carriers in orbital movement.

3. In an orbital lathe, an orbitally moving tool carrier, tool holding means movable in each of said carriers, mechanical driving means for actuating said tool holding means, a stop on said carrier for arresting movement of said tool holding means, means inter-connecting said tool holding means with said mechanical driving means whereby said driving means may continue to operate after said tool holding means has engaged said stop, and means for operating said tool carriers in orbital movement.

4. In an orbital lathe, orbitally moving carriers, tool holding means movable in each of said carriers, mechanical driving means for actuating said tool holding means, a stop on each of said carriers for arresting movement of said tool holding means, means inter-connecting said tool holding means with said mechanical driving means whereby said driving means causes all of said tool holding means to engage the stops on all of said carriers, and means for operating said tool carriers in orbital movement.

5. In an orbital lathe, orbitally moving tool carriers, tool holding means movable in each of said tool holding means a stop on each of said carriers for arresting movement of one or more of said tool holding means at the same time, and means for operating said tool carriers in orbital movement.

6. In an orbital lathe, a frame, an orbitally moving tool carrier mounted in said frame, tool holders movably mounted in said frame, screw feeding mechanism mounted on said carrier for actuating said tool holders, a source of power mounted on said frame for actuating said screw feeding mechanism, and inter-connecting means between said source of power and said screw feeding mechanism comprising a drive shaft connected to said feeding mechanism through a universal joint and to said source of power through a universal joint and a sliding connection.

7. In an orbital lathe, an orbitally moving tool carrier mounted in said frame, tool holders movably mounted in said carriers, screw feeding mechanism mounted on said carriers for actuating said tool holders, a source of power mounted on said frame for actuating said screw feeding mechanism and inter-connecting means between said source of power and said screw feeding mechanism comprising a drive shaft connected to said feeding mechanism through a universal joint, and to said source of power through a universal joint, a sliding connection, and an over-load safety clutch.

8. In an orbital lathe, a plurality of orbitally moving tool carriers mounted in said frame, tool holders movably mounted in said carriers, screw feeding mechanism mounted on each of said carriers for actuating said tool holders, a source of power mounted on said frame for actuating said screw feeding mechanism for each tool carrier, and inter-connecting means between said source of power and said screw feeding mechanism comprising a drive shaft associated with each tool carrier, connected to said feeding mechanism for each tool carrier through a universal joint and connected to said source of power through a universal joint, a sliding connection, and an over-load safety clutch.

WILLIAM F. GROENE.
HAROLD J. SIEKMANN.